(12) United States Patent
Cornu

(10) Patent No.: US 6,194,659 B1
(45) Date of Patent: Feb. 27, 2001

(54) CABLE ENTRY DEVICE

(75) Inventor: Hervé Cornu, Mont Cauvaire (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/214,513

(22) PCT Filed: May 11, 1998

(86) PCT No.: PCT/FR98/00936

§ 371 Date: Jan. 7, 1999

§ 102(e) Date: Jan. 7, 1999

(87) PCT Pub. No.: WO98/52264

PCT Pub. Date: Nov. 19, 1998

(30) Foreign Application Priority Data

May 14, 1997 (FR) .................................................. 97 05915
Feb. 26, 1998 (FR) .................................................. 98 02323

(51) Int. Cl.⁷ ...................................................... H02G 3/18
(52) U.S. Cl. ........................................................ 174/65 R
(58) Field of Search ............................... 174/65 SS, 65 R, 174/65 G, 135, 151, 152 G, 153 G; 248/56; 16/2.1, 2.2

(56) References Cited

U.S. PATENT DOCUMENTS

| | | | |
|---|---|---|---|
| 3,941,917 | * 3/1976 | Barrow et al. | 174/65 SS |
| 4,375,011 | * 2/1983 | Grunau | 174/65 SS |
| 4,490,576 | * 12/1984 | Bolante et al. | 174/65 SS |
| 4,600,803 | * 7/1986 | Holzmann | 174/65 SS |
| 4,686,738 | 8/1987 | Bladh | 174/65 SS X |
| 4,738,636 | * 4/1988 | Bolante | 174/65 SS X |
| 5,557,073 | * 9/1996 | Truesdale, Jr. et al. | 174/65 SS X |

FOREIGN PATENT DOCUMENTS

| | | |
|---|---|---|
| 384 654 | 11/1964 | (CH) . |
| 35 33 418 | 4/1986 | (DE) . |
| 2 402 323 | 3/1979 | (FR) . |
| WO 96/28862 | 9/1996 | (WO) . |

* cited by examiner

Primary Examiner—Dean A. Reichard
(74) Attorney, Agent, or Firm—Young & Thompson

(57) ABSTRACT

A cable insertion device comprising a seat having an opening, and an engagement portion extending peripherally around the opening axis, the engagement portion having an outer surface and, recessed relative thereto, an inner surface. The engagement portion is circularly segmented into grip jaws capable of elastic deformation by slots extending right up to the seat. At their connection with the seat, the grip jaws are each fixed therein along a fixing zone tangent to a circumference centered on the seat opening axis, and, with the engagement portion, which is made of relatively rigid material, is associated a sealing member, extending globally transverse relative to the seat opening axis, concealing at least partially the opening, and the sealing member is made of a relatively flexible material. The invention is useful, in particular, for equipping any chamber, such as a cabinet or the like.

39 Claims, 6 Drawing Sheets

CABLE ENTRY DEVICE

The present invention is generally concerned with cable entry devices used to pass a cable of any kind through a wall of any kind to which it is sealed, for example for a cable to enter an enclosure of any kind such as a case, cabinet or other enclosure of such type in a sealed manner.

It is more particularly concerned with cable entry devices having a seat with an opening through which the cable is passed and an engagement portion extending annularly around the axis of the opening in the seat, the engagement portion having an outside wall that extends toward the front and connecting it to the seat and an inside wall, set back toward the rear relative to the outside wall, connected to the latter in a U-shape arrangement.

A cable entry device of the above kind is described in French patent application No. 2 402 323 filed as application No. 77 26710 on Sep. 2, 1977.

In the above French patent application the entire device is made from an elastically deformable material.

Although an arrangement of the above kind is effective in terms of providing the required seal, the mechanical retention of the cable is relatively mediocre.

International patent application No. WO96/28862 proposes the use of jaws to assure this mechanical retention.

However, in the above international patent application the jaws are in a separate chamber which leads to a relatively complex overall construction.

Furthermore, the corresponding cable entry device being made as two shells which together form a globally parallelepiped-shape assembly, only two jaws can be provided and for the required mechanical retention to be satisfactory in spite of this the jaws are in practice in the form of self-wedging catches which further complicates overall construction.

German patent application No. 35 33 418 counterpart U.S. Pat. No. 4,686,738 also propose the use of jaws, in practice more than two jaws which are circumferentially arranged about the axis of the assembly and separated from each other by slots.

The jaws relate only to the inside wall of the engagement portion, however.

They are therefore relatively short.

They are also substantially rectilinear.

As a result, on the one hand, they are operative essentially through their stiffness, like the claws of a washer with its inside periphery divided into claws, which reduces the range of acceptable cable diameters, and, on the other hand, they have to be used in conjunction with actuator means, in this instance fingers forming part of the seat, and this leads to a relatively complex construction in which, formed on a component separate from the seat, the engagement portion is mobile axially relative to the seat, in practice screw-fashion.

Although the above German patent application also discloses a seal, the seal is in the form of a ring to be clamped onto the cable concerned, which implies the use of particular cam arrangements.

In European patent No. 0 753 918, in which the engagement portion is reduced to a single cylindrical wall, the jaws are also in the form of relatively rigid tongues, to be more precise in the form of plates, and each is articulated to the seat by a thinner area forming a hinge which in practice is tangential to a circumference concentric with the axis of the opening in the seat.

However, as previously, the jaws are relatively short and substantially rectilinear so that, also as previously, they are operative essentially through their stiffness, to the detriment of the range of acceptable cable diameters.

Also, ribs must be provided inside the engagement portion to provide them with additional support when necessary and project radially, to the detriment of the available cross section of the engagement portion.

Finally, in European patent application No. 0 753 918 there is no sealing member.

A general aim of the present invention is an arrangement which overcomes the above drawbacks.

To be more precise, the present invention consists in a cable entry device of the kind including a seat which has an opening through which a cable can be passed and an engagement portion which extends annularly around the axis of the opening in the seat, this engagement portion having an outside wall which extends toward the front and which is joined to the seat and an inside wall set back rearwardly relative to the outside wall and joined thereto in a U-shaped configuration, characterized in that, conjointly, the engagement portion is circumferentially divided into elastically deformable jaws by slots that extend as far as the seat, in that, where they join onto the seat, the jaws are each embedded therein in a root area tangential to a circumference concentric with the axis of the opening in the seat, and in that the engagement portion which is made of a relatively rigid material is associated with a sealing member globally transverse to the axis of the opening in the seat, at least partly shutting off that opening and made of a relatively flexible material.

Because of their shape and size, and because of the manner in which they are connected to the seat from which they arise, the jaws of the cable entry device in accordance with the invention are essentially operative in bending when a cable is engaged between them.

They therefore cater for a wide range of cable diameters of which they provide effective mechanical retention.

More generally the arrangement in accordance with the invention, which lends itself to many different embodiments, has the advantage of reconciling good mechanical retention of the cable with a good seal around the cable.

The features and advantages of the invention will emerge further from the following description given by way of example with reference to the accompanying diagrammatic drawings, in which.

Figure 8:
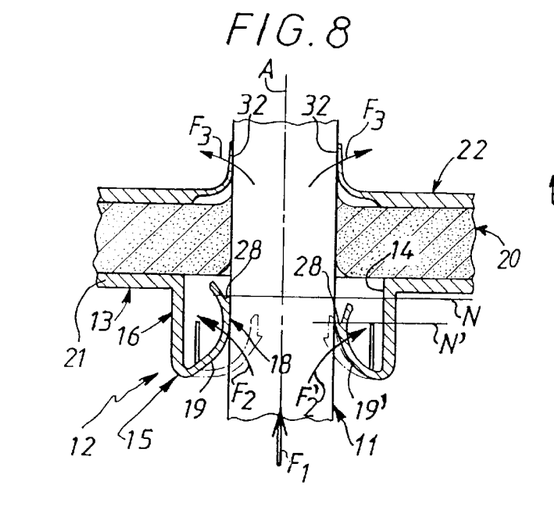
FIG. 8 is a perspective view derived from that of FIG. 1 showing how the cable entry device of the invention is used.
Figure 9:
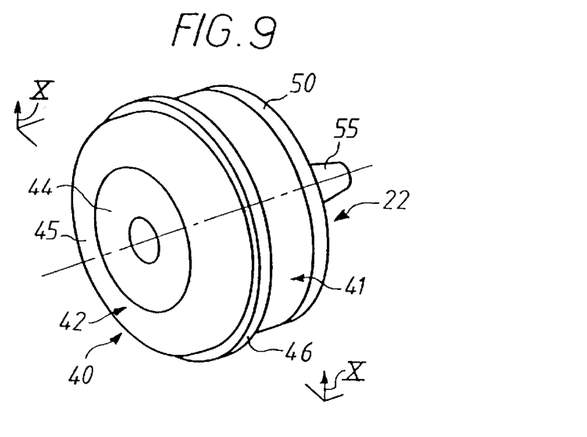
FIG. 9 is a view of the assembly in cross section taken along the line IX—IX in FIG. 8 and to a larger scale.
Figure 18:
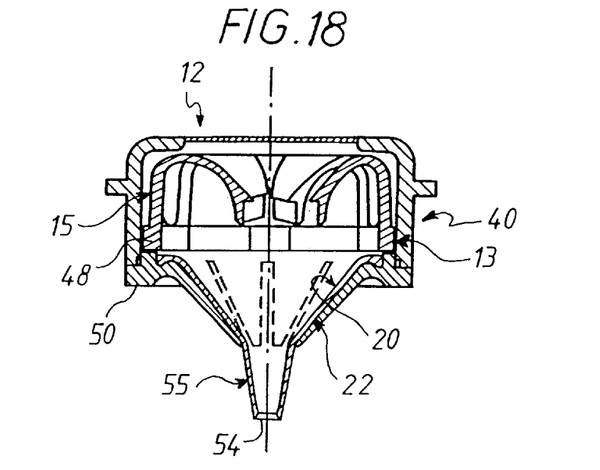
FIG. 18 is a view in cross section of this variant, similar to that of FIG. 9, but with an axial arrangement that is the opposite of that of FIG. 9.

As shown diagrammatically in FIGS. 8, 9 and 18 the overall aim is to convey at least one cable 11 which is in practice an electrical cable in a sealed manner through a wall of any kind, not shown in the figures.

A cable entry device 12 is used for this purpose, in a manner that is known in itself.

In a manner that is also known in itself the cable entry device 12 includes a seat 13 which has an opening 14 for the cable to pass through and an engagement portion 15 extending annularly around the axis A of the opening 14 in the seat 13.

In practice, the opening 14 has a circular contour and its diameter is significantly greater than that of the cable 11 to be inserted in it.

Figures 1, 2:
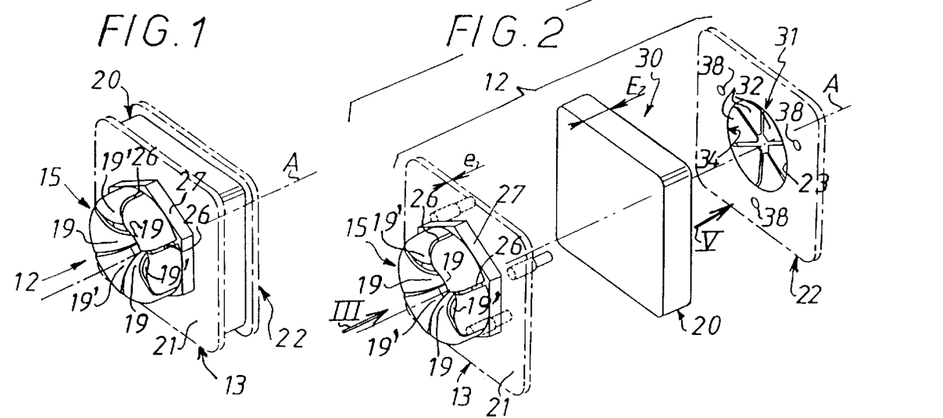
FIG. 1 is a perspective view of a cable entry device in accordance with the invention.
FIG. 2 is an exploded perspective view of the device.
Figure 3:
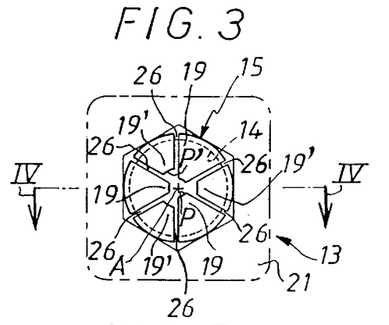
FIG. 3 is an elevation view of its front portion as seen in the direction of the arrow III in FIG. 2.
Figure 4:
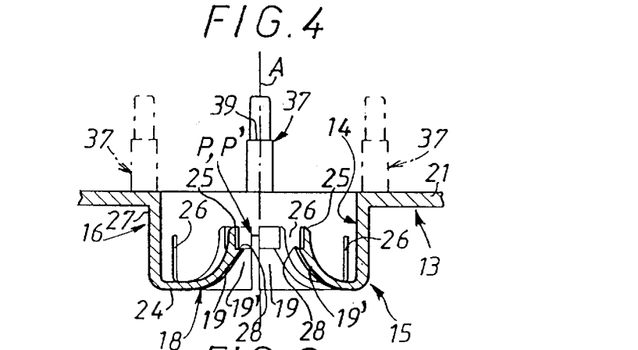
FIG. 4 shows the detail IV from FIG. 3 to a larger scale.
Figure 5:
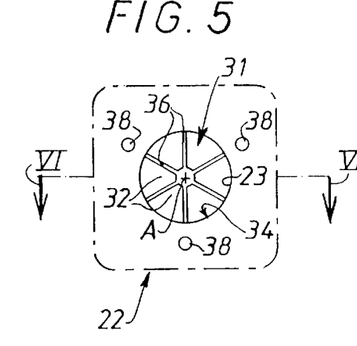
FIG. 5 is a view of the front portion in cross section taken along the line V—V in FIG. 3 and to a different scale.
Figure 6:
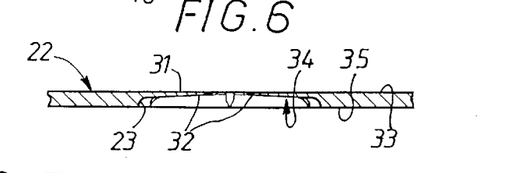
FIG. 6 is an elevation view of the rear portion of the cable entry device concerned as seen in the direction of the arrow VI in FIG. 2.

The axis A of the opening 14 is shown in chain-dotted line in FIGS. 1, 2 and 4 and its position is also shown in FIGS. 3 and 6.

In a manner that is known in itself the engagement portion 15 has an outside wall 16 extending toward the front and connecting it to the seat 13, extending in practice in the manner of a right cylinder from the edge of the opening 14 in the base 13, and an inside wall 18 set back to the rear relative to the outside wall 16, connecting to it in a U-shape arrangement.

In accordance with the invention the engagement portion 15 is divided circumferentially into elastically deformable jaws 19, 19' in a manner described in more detail hereinafter and the engagement portion 15, which is made of a relatively rigid material, is associated with a sealing member 20 extending globally transversely to the axis A of the opening 14 in the seat 13 and at least partly shutting off the opening 14. The member 20 is made from a relatively flexible material.

In the present context the expression "relatively rigid material" simply means a material for the engagement portion 15 which is more rigid than the material from which the sealing member 20 is made.

In other words, the stiffness of the engagement portion 15 and the flexibility of the sealing member 20 are in the present context simply to be understood as defined relative to each other.

In all the embodiments shown the sealing member 20 is to the rear of the engagement portion 15.

To be more precise, in the embodiments shown, the cable entry device 12 in accordance with the invention includes a rear portion 22 attached to and separate from the seat 13 and including an opening 23 coaxial with the opening 14 in the seat 13, and the sealing member 20 is at least in part operative between the engagement portion 15 and the rear portion 22.

In the embodiment more particularly shown in FIGS. 1 to 9 the seat 13 includes a plate 21 and the rear portion 22 forms a counter-plate substantially parallel to the plate 21.

The plate 21 and the rear portion 22 are of indeterminate size and one of them could be continuous with the wall through which the cable is to be passed.

This is why their contours are shown in chain-dotted line in FIGS. 1, 2, 3, 6 and 8.

For convenience, these contours are assumed to be square with rounded corners.

They could equally well have any other configuration, however.

Additionally, in this embodiment, the sealing member 20 is also a separate part and is operative between the plate 21 of the seat 13 and the counter-plate formed by the rear portion 22.

As in all the embodiments shown, the engagement portion 15 preferably projects at least in part toward the front on the seat 13.

In the embodiment particularly shown in FIGS. 1 to 9 the engagement portion 15 as a whole projects toward the front on the seat 13, to be more precise on the plate 21 thereof.

As shown here, for example, the engagement portion 15 is molded in one piece with the seat 13.

The assembly is made from any of the following materials, for example: PA (polyamide) 6.6, PC (polycarbonate), rigid PVC (polyvinyl chloride), ABS (acrylonitrile butadiene styrene), PP (polypropylene) or a mixture of such materials, for example a mixture of PC and ABS.

Be this as it may, the base 13 and the engagement portion 15 together form the front portion of the cable entry device 12 in this embodiment.

In this embodiment the sealing member 20 is preferably made of an elastically deformable material.

As in all the embodiments shown, the engagement portion 15 includes at least one jaw 19 of a first type, referred to herein for convenience only as a long jaw 19, the end of which when unstressed envelops a relatively narrow passage P, and at least one jaw 19' of a second type, referred to herein for convenience only as a short jaw 19', the end of which when unstressed envelops a relatively wide passage P'.

As shown here, for example, the engagement portion 15 comprises alternating long jaws 19 and short jaws 19'.

Thus in the various embodiments shown there are three long jaws 19 alternating with three short jaws 19'.

All the jaws 19, 19' have a globally triangular contour converging toward the axis A of the opening 14 in the seat 13 and terminating in a circular arc at a distance from the axis A to define the corresponding passage P, P'.

Like the opening 14 in the seat 13, with which they are concentric, the passages P, P' have circular contours but their diameters are less than that of the opening 14, the diameter of the passage P being itself less than the diameter of the passage P'.

In the embodiment more particularly shown in FIGS. 1 to 9 the jaws 19, 19' are quasi-adjacent each other along the whole of their lateral edges, which are substantially rectilinear.

In axial section the jaws 19, 19' have a globally U-shape profile.

To be more precise, in axial section they have a rounded profile along the inside wall 18 of the engagement portion 15 and a substantially rectilinear profile along the outside wall 16 thereof. Where the inside wall 18 and the outside wall 16 join, the long jaws 19 have a flat 24 substantially perpendicular to the axis A of the opening 14 in the seat 13.

In the various embodiments shown the corresponding passage P, P' is defined by the jaws 19, 19' by means of an end section 25 which, when unstressed, is substantially parallel to the axis A of the opening 14 in the seat 13.

In accordance with the invention the engagement portion 15 is divided circumferentially into jaws 19, 19' by radially elongate slots 26 in a star-like configuration about the axis A of the opening 14 in the seat 13, extending as far as the seat 13 and therefore affecting both the inside wall 18 of the engagement portion 15 and its outside wall 16, running the entire height thereof.

In accordance with the invention, where they join onto the seat 13 the jaws 19, 19' are each embedded in it in a root area Z tangential to a circumference C centered on the axis A of the opening 14 in the seat 13.

In the embodiments shown the circumference C is the same for all of the jaws 19, 19'.

In the embodiment more particularly shown in FIGS. 1 to 9 the slots 26 extend as far as a flange 27 where the outside wall 16 of the engagement portion 15 joins onto the seat 13.

As shown here, for example, the edge of the flange 27 forms a hexagon.

As in all the embodiments shown, the jaws 19, 19' formed by the engagement wall 15 preferably have at least one detent 28 projecting transversely from their outside surface toward the axis A of the opening 14 of the seat 13.

In the embodiment more particularly shown in FIGS. 1 to 9 there is only one such detent 28 at the root of the end portion 25 of the jaws 19, 19' and it is substantially perpendicular to the axis A of the opening 14 in the seat 13.

In this embodiment the sealing member 20 is locally part of a plate 30 sandwiched between the plate 21 of the seat 13 and the rear portion 22.

As shown, the thickness E of the plate 30 is preferably a multiple $\underline{n}$ of thickness $\underline{e}$ of the plate 21 of the seat 13 (see FIG. 2).

For example, n is at least equal to three.

For example, the sealing member 20 can at least initially be continuous, i.e. solid, having no bore in it and even no bore precursor.

It then completely shuts off the opening 14 in the seat 13.

It must therefore be forcibly perforated when the cable 11 is inserted, for example using a screwdriver or any other accessory.

The plate 30 of which the sealing member 20 is part is made of foam rubber, for example.

In this embodiment the counter-plate formed by the rear portion 22 is globally parallel to the plate 21 of the seat 13.

Like the engagement portion 15 it is made of a relatively rigid material.

It is made from the same material as the engagement portion 15, for example.

In all the embodiments shown the rear portion 22 includes a web 31 which at least partly shuts off its opening 23 and which is divided circumferentially into elastically deformable jaws 32.

In the embodiment more particularly shown in FIGS. 1 to 9 the web 31 of the rear portion 22 is thinner than the counter-plate that the rear portion 22 forms around it, that thickness being itself substantially equal to the thickness e of the plate 21 of the seat 13.

As shown here, for example, the web 31 of the rear portion 22 is level on the outside with the outside surface 33 of the counter-plate that the rear portion 22 forms around it (see FIG. 6) and it is operative at the bottom of a recess 34 on its inside surface 35.

Like the jaws 19, 19' of the engagement portion 15, the jaws 32 of the rear portion 22 have a triangular contour when seen in plan view, converging toward the axis A of the opening 14 in the seat 13 and terminating in a circular arc at a distance from that axis A.

In the embodiments shown there are six jaws 32 and they are all the same size.

However, as previously, there can be long jaws 32 and short jaws 32.

In practice the jaws 32 formed by the web 31 of the rear portion 22 are separated from each other by radially elongate slots 36 in a star-like configuration around the axis A of the opening 14 in the seat 13.

In the embodiments shown the jaws 32 are of reducing thickness from their root to their free end.

As in the embodiment more particularly shown in FIGS. 1 to 8, the jaws 32 of the rear portion 22 are face to face with the respective jaws 19, 19' of the engagement portion 15, for example.

However, they can instead be offset circumferentially relative to the latter.

In this embodiment the rear portion 22 is crimped to the plate 21 of the seat 13.

As shown here, for example, the plate 21 carries a plurality of projecting crimping lugs 37 which are circumferentially distributed around the axis A of the opening 14 in the seat 13 and which, after passing through the sealing member 20, pass through bores 38 in the rear portion 22 in corresponding relationship thereto.

As in the embodiment shown, the crimping lugs 37 preferably have a transverse shoulder 39 against which the rear portion 22 abuts and which thereby form a spacer.

They are afterwards simply heated and crimped over the rear portion 22.

Figure 7:
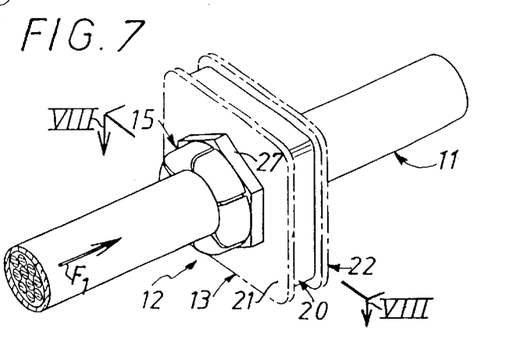
FIG. 7 is a view of the rear portion in cross section taken along the line VII—VII in FIG. 6 and to a larger scale.

The cable 11 is inserted from the front, in the direction of the arrow F1 in FIGS. 7 and 8.

During its insertion, the jaws 19, 19' on the engagement portion 15 are pushed back radially in the direction away from the axis A of the opening 14 in the seat 13.

Figure 10:
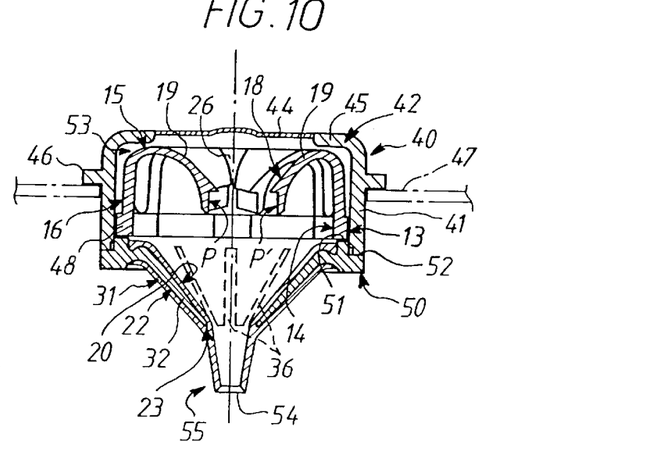
FIG. 10 is a diagrammatic view in cross section showing how the jaws of the cable entry device of the invention work.
Figure 11:
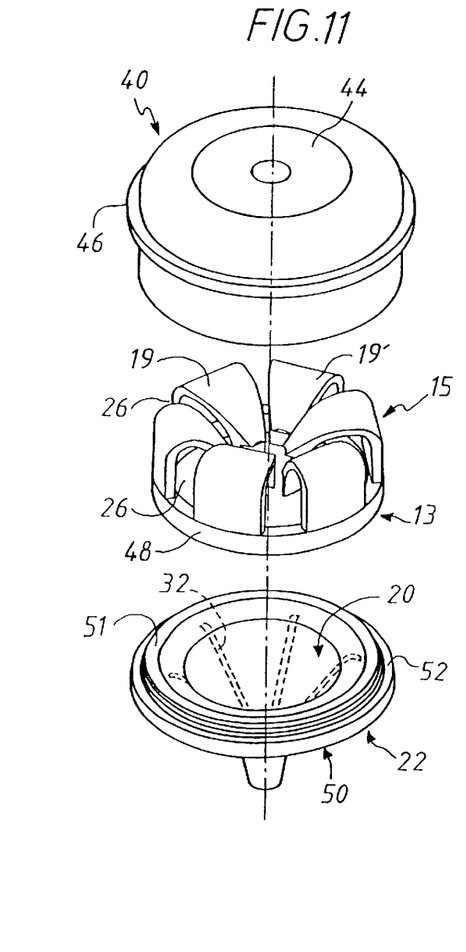
FIG. 11 is a perspective view analogous to that of FIG. 1 showing a variant of the cable entry device of the invention.
Figure 12:
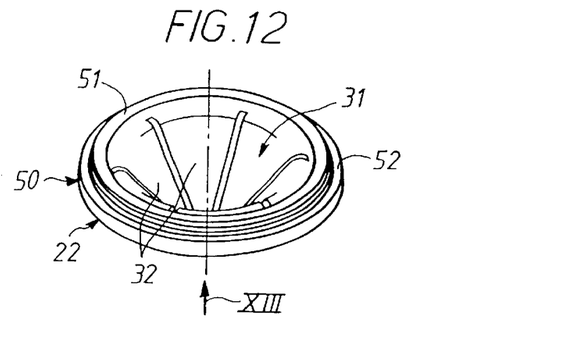
FIG. 12 is a view of this variant in axial section taken along the line XII—XII in FIG. 11.
Figure 13:
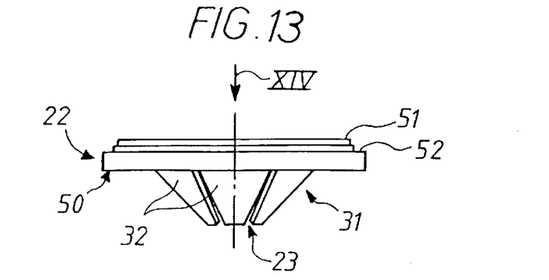
FIG. 13 is an exploded perspective view of this variant.
Figure 14:
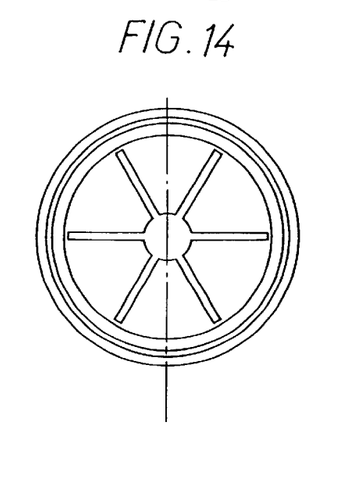
FIG. 14 is a locally cut away plan view of the front part of this embodiment as seen in the direction of the arrow XIV in FIG. 13.
Figure 15:
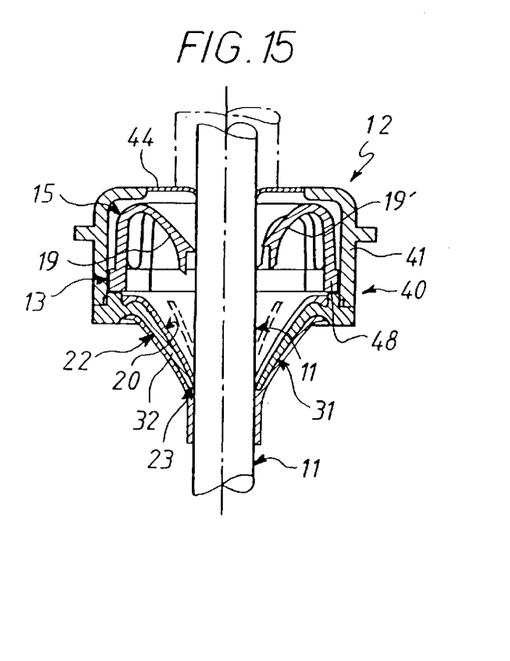
FIG. 15 is a perspective view of the rear portion of this variant, shown in isolation.
Figure 16:
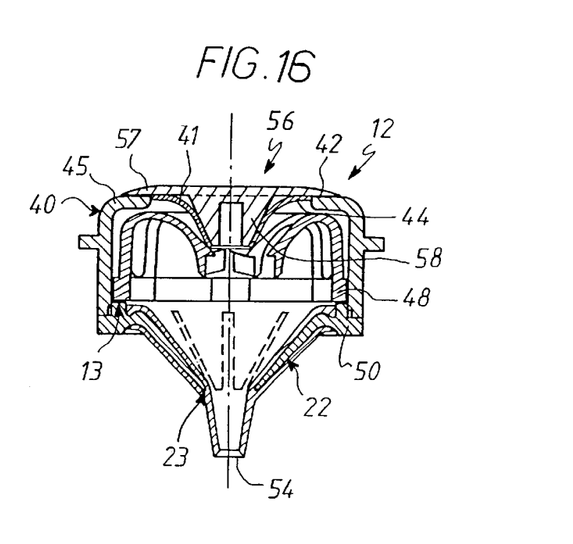
FIG. 16 is an elevation view of the rear portion as seen in the direction of the arrow XVI in FIG. 15.

Initially (FIG. 10A) because of their elasticity the inside branches of the jaws 19, 19'corresponding to the inside wall 18 of the engagement portion 15 simply flex, rotating relative to the outside wall 16 of the engagement portion 15, as indicated by arrows F2, F'2 in FIG. 10A.

As the cable 11 is inserted further (FIG. 10B) this elasticity adds to such rotation initial flexing outward of the outside branch of the jaws 19, 19' corresponding to the outside wall 16 of the engagement portion 15, as indicated by arrows F3, F'3 in FIG. 10B, just as if, because it is rooted to the seat 13, the outside branch of the jaws 19, 19' were operative in the manner of a built-in beam.

This flexing of the outside branch of the jaws 19, 19' is then accentuated (FIG. 10B) until the final configuration shown in FIG. 10B is reached.

Accordingly the jaws 19, 19' are operative elastically over the whole of their length, as much by movement toward each other of their two branches as by flexing of their outside branch.

The cable is forced through the sealing member 20 and the jaws 32 of the rear portion 22 are themselves pushed backwards, in the direction of the arrows F4 in FIG. 9.

The mechanical retention of the cable 11 is assured by friction, essentially by the jaws 19, 19' of the engagement portion 15, but also by the sealing member 20 and by the jaws 32 of the rear portion 22.

Because they are different lengths the jaws 19, 19' of the engagement portion 15, or rather their detents 28, are advantageously operative at two different levels, namely (see FIG. 9) at a level N relatively close to the plate 21 of the seat 13, in the case of the long jaws 19 and a level N' relatively far from the plate 21, in the case of the short jaws 19'.

This strengthens the required mechanical retention.

The seal is provided by the sealing member 20, which grips the cable 11 continuously all around the exterior of the cable 11.

Clearly the rear portion 22 advantageously holds the sealing member 20 in place, by confining it, and prevents it bursting when perforated.

It additionally and advantageously contributes to guiding the cable 11 by holding it perpendicular to the plate 21 of the seat 13 and strengthens its mechanical retention.

Because of the overall capacity for elastic deformation, the cable entry device 12 of the invention advantageously suits an entire range of cables 11 with different diameters.

In the embodiments shown in FIGS. 11 to 25 the cable entry device 12 of the invention includes a cap 40 which covers its engagement portion 15.

The cap 40 has a lateral wall 41 surrounding the outside wall 16 of the engagement portion 15 and a front wall 42 in front of the engagement portion 15.

The side wall 41 at least is made of a relatively rigid material and the front wall 42 includes a closure 44 which can be pushed in and which covers a part of its surface. The closure is made from a relatively flexible material.

The side wall 41 is made from the same material as the engagement portion 15 and the rear portion 22, for example, and the closure 44 which can be pressed in is made of an elastomer.

In the embodiment shown the front wall 42 has at its periphery and continuous with the side wall 41 a washer 45 which is in one piece with the side wall 41.

In this case the closure 44 that can be pressed in covers only a portion of the surface of the front wall 42, here its central portion.

In the embodiments shown the side wall 41 of the cap 40 has an annular rib 46 projecting from its outside surface halfway up its height and adapted to serve as a guard through which the assembly bears on a wall 47 to be equipped with the cable entry device, as shown in chain-dotted line in FIG. 10, bearing either against the outside surface of the wall 47 or against its inside surface.

In the embodiments shown in FIGS. 11 to 25 the seat 13 is reduced to a cylinder 48 and the rear portion 22 includes a cylinder 50 with a shoulder 51 bracing the seat 13 formed by the cylinder 48.

In these embodiments the cap 40 and the rear portion 22 are fastened together.

As shown here, for example, the cylinder 50 of the rear portion 22 has around but set back from its shoulder 51 a shoulder 52 against which bears the edge of the side wall 41 of the cap 40 and the cap 40 is attached to the rear portion 22 at this level, by welding or otherwise, for example by ultrasound welding.

Be this as it may, in the embodiments shown in FIGS. 11 to 25 the cap 40 and the rear portion 22 together delimit an enclosure 53 in which the engagement portion 15 and the seat 13 to which it is attached are trapped.

As shown here, for example, the outside surface of the cylinder 48 of the seat 13 bears against the inside surface of the side wall 41 of the cap 40.

Similarly, the top area of the engagement portion 15 can if required bear on the washer 45 of the front wall 42 of the cap 40.

In the embodiments shown in FIGS. 11 to 25 the slots 26 between the jaws 19, 19' are substantially wider at the level of the seat 13 to facilitate the movement of the jaws 19, 19'.

As shown here, for example, they have a width Li at the level of the seat 13 greater than one third the width L2 of the jaws 19, 19' at this same level.

In these embodiments the lateral edges of the inside branch of the jaws 19, 19' are globally rounded.

In the embodiments shown in FIGS. 11 to 25 the sealing member is molded onto at least a portion of the rear portion 22.

As shown here, for example it is molded onto the web 31 of the rear portion 22.

In a non-illustrated embodiment, the sealing member is on both sides of the web 31 of the rear portion 22, totally enclosing the jaws 32 of the web 31.

In other words, it extends over the front face of the web 31, i.e. the face thereof facing toward the engagement portion 15, and over the rear face of the web 31, i.e. the face thereof facing away from the engagement portion 15. According to an alternative embodiment, also not shown, the sealing member extends over only the rear surface of the rear portion and not over the front surface of the rar portion as illustrated in FIG. 9.

Moreover, in the embodiments shown in FIGS. 11 to 23 the sealing member 20 includes an opening 54 coaxially with the opening 14 in the seat 13.

Finally, in these embodiments, the web 31 of the rear portion 22 is globally frustoconical with its concave side facing toward the engagement portion 15.

As in the embodiments shown, the sealing member 20 preferably forms a tube 55 beyond the free end of the jaws 32 of the web 31 of the rear portion 22 and the tube extends axially away from the engagement portion 15. The opening 54 of the sealing member 20 is at the end of the tube.

As in the embodiments shown, the tube 55 formed in this way by the sealing member 20 is preferably frustoconical with a smaller cone angle than the web 31 of the rear portion 22.

In other words, the half-angle at the apex of the frustoconical tube 55 of the sealing member 20 is less than the half-angle at the apex of the frustoconical web 31 of the rear portion 22.

The sealing member 20 is made of an elastomer, for example.

The remaining features are as before.

The device is also used as before (see FIG. 15), by forcibly passing the cable 1' through the press-in closure 44 in the cap 40.

To facilitate this insertion a disc can be pre-cut in the central area of the press-in closure 44.

As previously and as shown in chain-dotted line in FIG. 18 the cable entry device 12 of the invention advantageously caters for cables 11 with different diameters.

Clearly, in all cases the side wall 41 of the cap 40 advantageously prevents excessive movement apart of the jaws 19, 19' of the engagement portion 15.

It therefore contributes to more effective mechanical retention of the cable 11.

Also, and most importantly, it advantageously opposes penetration of water into the engagement portion 15 and thereby prevents water accumulating on the upstream said of the sealing member 20, to the benefit of the required watertight closure.

The elastomer from which the press-in closure 44 is made is translucent or even transparent so that the interior volume of the cable entry device 12 of the invention can be seen.

Clearly the jaws 32 in the web 31 of the rear portion 22 advantageously constitute an armature for the sealing member 20, to the benefit of its mechanical strength.

Operative at the surface of the rear portion 22, the sealing member 20 also and advantageously facilitates sliding of the cable 11 along the latter and provides the required seal around the cable 11.

A tool, not shown, in the form of a canula can advantageously be provided to facilitate removal of the cable, if required.

Figure 19:
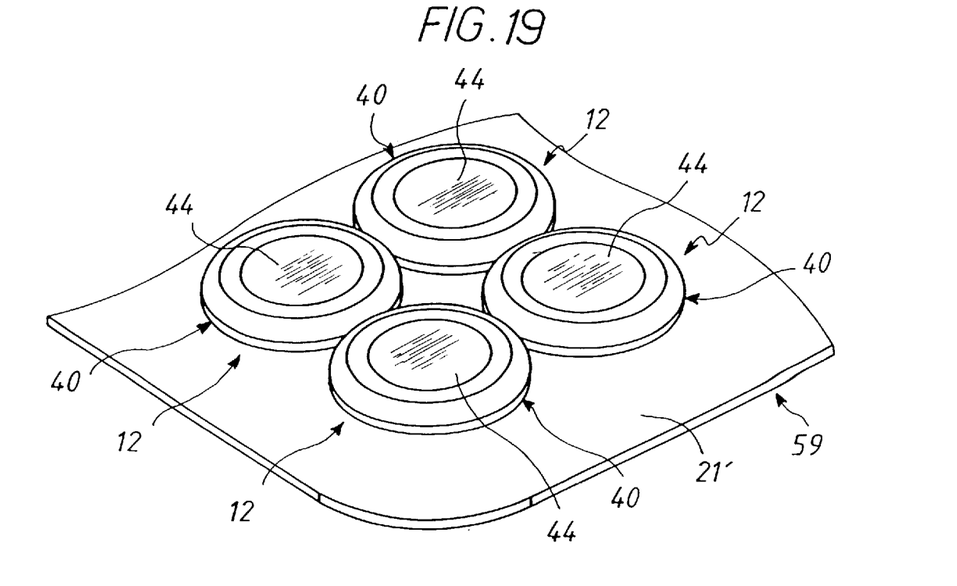
FIG. 19 is a view in cross section analogous to that of FIG. 12 showing a further development of this variant.

As shown in FIG. 19, if required a plug 56 can be provided to plug and seal the cable entry device 12 after a first use by shutting off the press-in closure 44 of the cap 40 of the cable entry device 12, which will then have been pressed in.

As shown here, for example, the plug 56 includes a plate 57 which bears on the washer 45 on the front wall 42 of the cap 40 and a globally frustoconical boss 58 projecting from the inside surface of the plate 57 which enters the press-in closure 44, progressively pushing it back in the radial direction.

Figure 17:
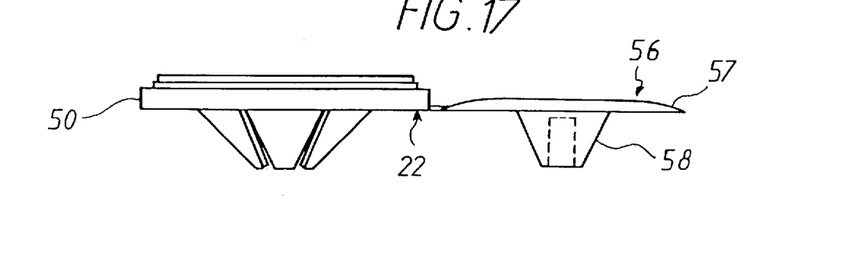
FIG. 17 a top view of it as seen in the direction of the arrow XVII in FIG. 16.

As shown in FIG. 17, the plug 56 can if required be molded in one piece with the rear portion 22.

Figures 20, 21, 22:
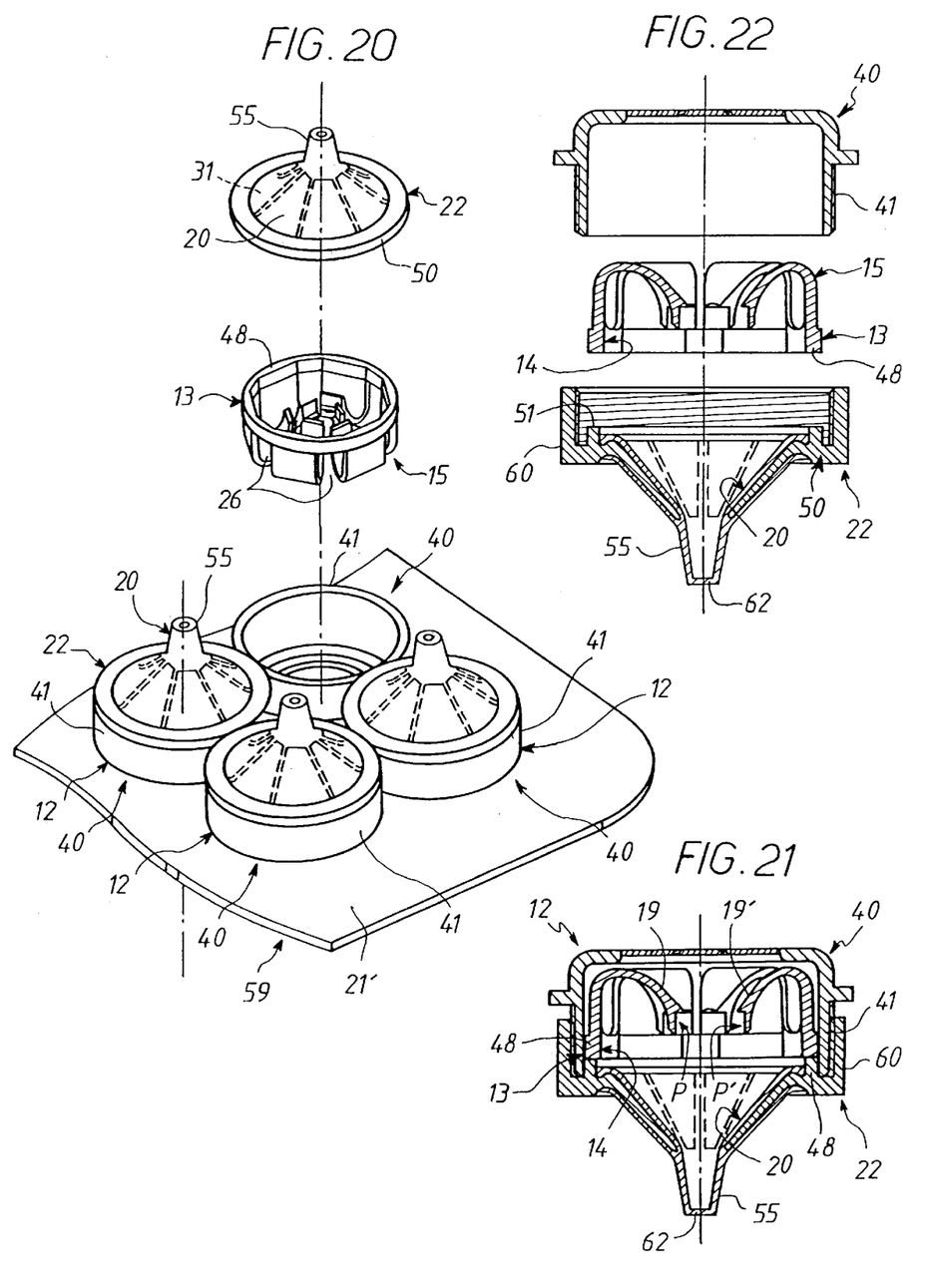
FIG. 20 is an elevation view analogous to that of FIG. 16 and relating to the aforementioned development.
FIG. 21 is a view in cross section analogous to that of FIG. 12 and relating to another variant of the cable entry device of the invention.
FIG. 22 is a perspective view of an entity comprising a plurality of cable entry devices in accordance with thee invention seen from the front.

In the embodiment shown in FIG. 21 the sealing member 20 extends over only the front face of the rear portion 22.

In another embodiment that is not shown the sealing member 20 extends over only the rear face of the rear portion 22.

In both cases other features are as before.

In the foregoing description the cable entry device 12 of the invention is operative on its own and there is only one cable 11.

Figures 23, 24, 25:
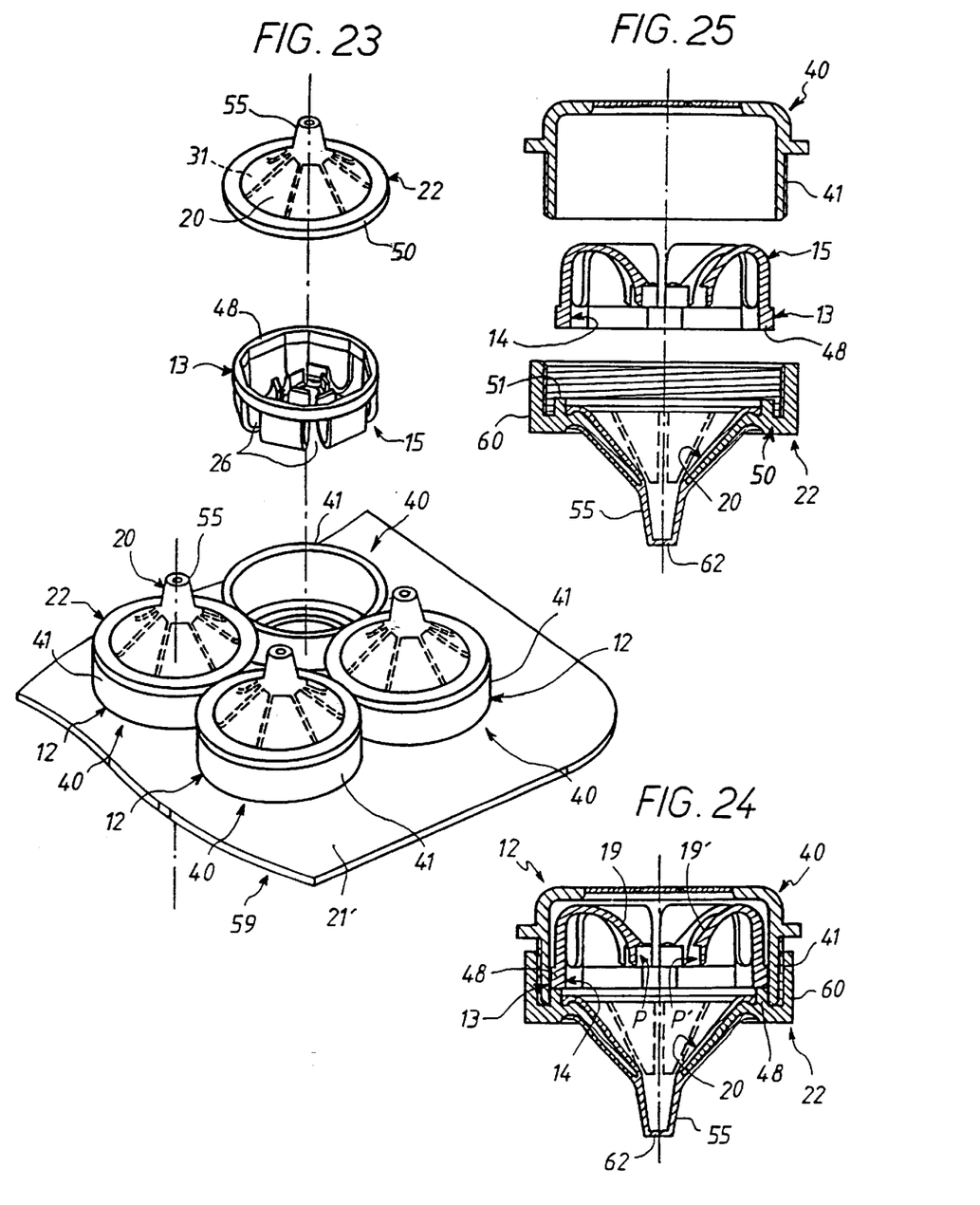
FIG. 23 is a partly exploded perspective view of the aforementioned entity seen from the rear.
FIG. 24 is a view in cross section analogous to that of FIG. 12 and relating to another variant of the cable entry device in accordance with the invention.
FIG. 25 is an exploded view in cross section of the latter variant.

In the embodiment shown in FIGS. 22 and 23 it is associated with at least one other cable entry device 12 of the same kind and another cable 11, not shown, sharing a common plate 21, 21' with the other cable entry device 12.

As shown here, for example, it is associated with a plurality of other cable entry devices 12 for the same number of cables 11.

In these figures the cable entry devices 12 are identical and are of the type described with reference to FIGS. 11 to 21.

Their common plate 21' is substituted for the rib 46 on their cap 40.

In other words, their cap 40 is in one piece with the plate 21' they share with at least one other.

As shown in FIG. 23, all that is then required is to stack successively into each cap 40, first the combination of an engagement portion 15 with the seat 13 to which it is attached, then the combination of the rear portion 22 and the sealing member 20 covering its web 31, and then weld the rear portion 22 to the cap 40, as described above.

As shown here, for example, the various cable entry devices 12 associated in this manner are disposed in rows, possibly staggered rows.

With their common plate 21' they constitute an entity 59 which, if required, can advantageously be fixed, for example welded, clipped or screwed, to any wall having a corresponding opening, possibly with a seal around the opening in the wall.

Alternatively, the cable entry device 12 of an entity 59 of the above kind can be of the type described with reference to FIGS. 1 to 9.

In the embodiment shown in FIGS. 21 and 22 the cable entry device 12 of the invention is used on its own, in the manner of a stuffing gland.

The cable entry device 12 is, for example, globally of the type described with reference to FIGS. 11 to 21.

However, its cap 40 is screwed to the rear portion 22.

As shown here, for example, the rear portion 22 has a sleeve 60 beyond and coaxial with its cylinder 50 and which has a screw threaded inside surface.

The outside surface of the side wall 41 of the cap 40 is correspondingly screw threaded beyond its rib 46.

In this embodiment the sealing member 20 completely shuts off the opening 14 in the seat 13, the end of the tube 55 formed by the sealing member 20 being closed by a closure 62. The present invention is clearly not limited to the embodiments described and shown but encompasses any variant execution and/or combination of their various component parts, especially with regard to the number and/or the distribution and/or the configuration of the jaws of the engagement portion.

What is claimed is:

1. Cable entry device comprising a seat having an opening with an axis, said opening being adapted for the passage of a cable and an engagement portion, said engagement portion having an outside wall forwardly extending from said seat and an inside wall extending rearwardly from said outside wall, said engagement portion being made of relative rigid material and comprising plural elastically deformable jaws arranged circumferentially and separated from one another by slots, said slots extending along said inside and outside walls of said engagement portion and rearwardly at least as far as said mounting seat, said jaws being joined to a root area tangential to a circumference concentric with said opening, and a sealing member made of relatively flexible material and disposed transversely to said axis, said sealing member at least partially shutting off said opening and cooperable with a cable passing through said opening.

2. Cable entry device according to claim 1, wherein said jaws include long jaws defining a relatively narrow passage when unstressed and short jaws define a relatively large passage when unstressed.

3. Cable entry device according to claim 2, wherein said long jaws and short jaws circumferentially alternate.

4. Cable entry device according to claim 1, wherein each of said jaws has along said inside wall at least one transverse detent projecting toward said axis.

5. Cable entry device according to claim 1, wherein said jaws in said inside wall are of triangular contour when viewed rearwardly along said axis.

6. Cable entry device according to claim 1, wherein the slots between adjacent ones of said jaws have a circumferential width greater than one third the circumferential width of said jaws proximate to said root areas.

7. Cable entry device according to claim 1, wherein said sealing member is made of an elastically deformable material.

8. Cable entry device according to claim 1, wherein said sealing member is of closed annular configuration.

9. Cable entry device according to claim 1, wherein said sealing member is located rearwardly of said engagement portion.

10. Cable entry device according to claim 1, further comprising a rear portion disposed rearwardly of said seat said and attached thereto, said rear portion having an opening coaxial with said opening in said seat.

11. Cable entry device according to claim 10, wherein said seat includes a plate, said rear portion defining a counter-plate substantially parallel to said plate, and said sealing member is operatively mounted between said plate and said counter-plate.

12. Cable entry device according to claim 11, wherein said rear portion comprises a web defining said opening in said rear portion, said web being thinner than said counter-plate.

13. Cable entry device according to claim 11, wherein sealing member comprises part of another plate sandwiched between said plate of said seat and said counter-plate.

14. Cable entry device according to claim 13, wherein said other plate has a thickness which is a multiple of the thickness of said plate of said seat.

15. Cable entry device according to claim 14, wherein said other plate is made of foam rubber.

16. Cable entry device according to claim 10, wherein said sealing member is in overmolded relationship with said rear portion.

17. Cable entry device according to claim 16, wherein said seat comprises a first cylindrical portion, and said rear portion that comprises a second cylindrical portion, said second cylindrical portion bracing said first cylindrical portion.

18. Cable entry device according to claim 16, wherein said sealing member has an opening therein aligned with said opening in said seat.

19. Cable entry device according to claim 16, wherein said sealing member is made of elastomeric material.

20. Cable entry device according to claim 16, wherein said rear portion comprises a web defining said opening therein, said web being generally frustoconical, said frustoconical web having a concave side facing toward said engagement portion and at a location beyond said elastically deformable jaws, said sealing member also including a tube extending axially away from said engagement portion.

21. Cable entry device according to claim 20, wherein said tube is also frustoconical, said tube having a cone angle smaller than the cone angle of said frustoconical web.

22. Cable entry device according to claim 16, wherein said rear portion comprises a web defining said opening in said rear portion, said sealing member being in overmolded relationship with said web.

23. Cable entry device according to claim 22, wherein said sealing member extends over a forward face of said rear portion.

24. Cable entry device according to claim 22, wherein said sealing member extends over a rear face of said rear portion.

25. Cable entry device according to claim 22, wherein said sealing member extends on respective opposite sides of said web, said sealing member totally surrounding said elastically deformable jaws of said rear portion.

26. Cable entry device according to claim 1, wherein said rear portion includes an opening, circumferentially spaced elastically deformable jaws extending radially into said opening in said rear portion.

27. Cable entry device according to claim 1, wherein said sealing member is operatively mounted between said engagement portion and said rear portion.

28. Cable entry device according to claim 1, wherein said sealing member is annular but substantially closed at said axis when unstressed.

29. Cable entry device according to claim 1, wherein a flange joins said outside wall to said seat.

30. Cable entry device according to claim 1, wherein said engagement portion is in one piece with said seat.

31. Cable entry device according to claim 1, wherein the cable entry device operates as a single stuffing gland.

32. Cable entry device according to claim 1, wherein said engagement portion extends substantially entirely forwardly of said seat.

33. Double cable entry device according to claim 1, wherein said seat comprises a plate, and further comprising another said cable entry device arranged opposite and aligned with the first mentioned cable entry device, said plate being common to said seats of both of the cable entry devices.

34. Double cable entry device according to claim 33, wherein said seat comprises a plate, and further comprising another said cable entry device arranged opposite d aligned with the first mentioned cable entry device, said plate being common to said seats of both of the cable entry devices.

35. Cable entry device according to claim 1, further comprising a cap covering said engagement portion.

36. Cable entry device according to claim 35, wherein said cap comprises a sidewall extending around said outside wall and a front wall forwardly of said engagement portion, at least said sidewall being made of a relatively rigid material, said front wall including a push-in closure which is made of relatively flexible material.

37. Cable entry device according to claim 36, further comprising a rear portion disposed rearwardly of said seat and attached thereto, said rear portion having an opening coaxial with said opening in said seat, wherein said cap is attached to said rear portion and defines with said rear portion an enclosure, said engagement portion and said mounting seat being held captive in said enclosure.

38. Cable entry device according to claim 37, wherein said cap is welded to said rear portion.

39. Cable entry device according to claim 37, wherein said cap is screwed onto said rear portion.

* * * * *